Feb. 13, 1940.　　　S. B. KURZINA, JR　　　2,189,956
COASTER BRAKE AND METHOD OF MAKING SAME
Filed May 15, 1937

Witness:
Burr W. Jones

INVENTOR.
Stanley B. Kurzina Jr.
BY
ATTORNEY.

Patented Feb. 13, 1940

2,189,956

UNITED STATES PATENT OFFICE 2,189,956

COASTER BRAKE AND METHOD OF MAKING SAME

Stanley B. Kurzina, Jr., Elmira, N. Y., assignor, by mesne assignments, to Bendix Aviation Corporation, South Bend, Ind., a corporation of Delaware Application May 15, 1937, Serial No. 142,872

6 Claims. (Cl. 29—152.1)

The present invention relates to coaster brakes for bicycles and the like and more particularly to the structure and method of manufacture of the braking element thereof.

In that form of coaster brake known commercially as the "Morrow" brake because the device is constructed substantially in accordance with the disclosure of the patent to Morrow 906,149, December 8, 1908, the braking element consists of an elastic sleeve which is expanded into engagement with the interior of the hub so as to make frictional contact therewith. As this sleeve has heretofore been constructed, the expansion thereof distorted it out of true cylindrical shape, so that the frictional contact occurred only at certain spots of comparatively small area, thus causing localized and uneven wear of the sleeve and hub. The contact surfaces were also apt to become glazed, thus contributing to poor braking and accentuating the failure to utilize the maximum effectiveness of the brake.

It is an object of the present invention to provide a novel braking device for a coaster brake which is efficient and reliable in action over long periods of use.

It is another object to provide such a device incorporating an expansible brake sleeve which is effective throughout substantially its entire surface.

It is a further object to provide such a device in which the brake sleeve is arranged to be substantially truly cylindrical when it is expanded into effective position.

It is another object to provide a novel method of manufacturing brake sleeves of the type indicated.

Further objects and advantages will be apparent from the following description taken in connection with the accompanying drawing in which.

Figure 1:
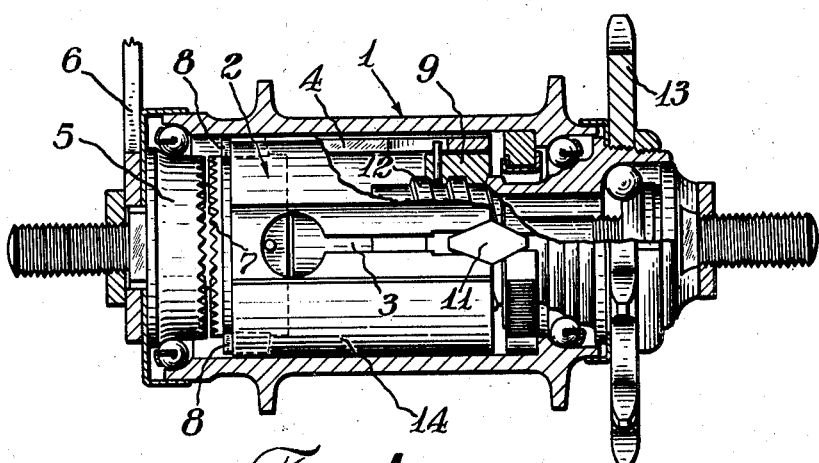
Fig. 1 is a side elevation partly in section and partly broken away showing a preferred embodiment of the present invention.

Referring first to Fig. 1 of the drawing, there is illustrated a coaster brake of the "Morrow" type comprising a hub 1 interiorly cylindrical, and a brake sleeve 2 mounted therein. The brake sleeve is provided with longitudinal slots 3 and 4 entering the sleeve from the opposite ends alternately and traversing the major portion of the sleeve in order to render the same elastically expansible.

Means for anchoring the sleeve against rotation are provided in the form of a toothed anchor member 5 which is prevented from rotation by a torque arm 6, and a toothed clutch member 7 adapted to engage therewith and nonrotatably connected to the sleeve 2 by means of wedge lugs 8 which engage in the flared ends of slots 4.

Means for expanding the sleeve 2 into engagement with the hub is provided including a nut 9 carrying wedge lugs 11 which are forced into the flared ends of the slots 3 by the action of screw threads 12 on the hub of the sprocket 13 and cooperate with the lugs 8 to expand the sleeve.

The outer surface of the sleeve 2 may be provided with brake shoes 14 of brass or other suitable material of cylindrical conformation suitably attached to the sleeve as by means of rivets.

Figure 2:
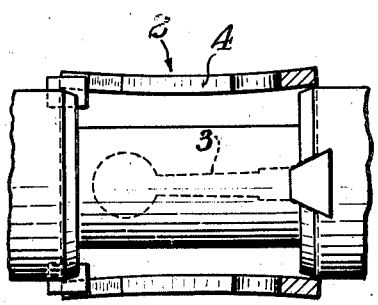
Fig. 2 is a detail partly in section showing one step in the preferred method of manufacture of the device.
Figure 3:
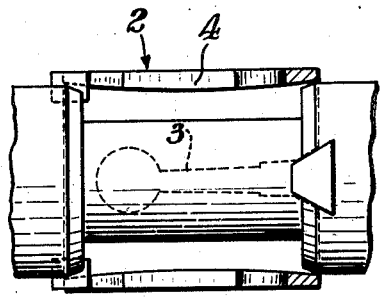
Fig. 3 is a similar view showing a further step in such method of manufacture.
Figure 4:
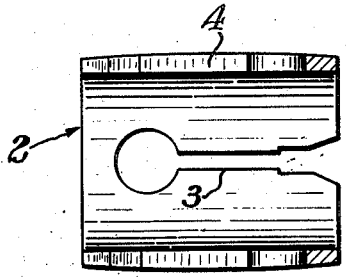
Fig. 4 is a detail in longitudinal section of a completed brake sleeve constructed in accordance with the present invention.

According to the present invention, the sleeve 2 when relaxed is slightly convex longitudinally as illustrated in Fig. 4, while the segmental portions thereof between the slots 3 and 4 are formed with a radius substantially the same as the interior of the hub 1. The brake sleeves are so formed by taking a suitable cylindrical tube of slightly less diameter than the interior of the hub, forming longitudinal slots therein by punching or milling operations or a combination thereof, mounting the elastic sleeve so formed on an expanding arbor as shown in Fig. 2, and operating the arbor to expand the sleeve until its minimum diameter is substantially the same as the interior of the hub so that the sleeve assumes an hour glass shape as there illustrated. The sleeve is then milled off to a true cylindrical conformation of substantially the same diameter as the interior of the hub 1, as illustrated in Fig. 3. When the sleeve is removed from the arbor, it then springs back to its original internal diameter and assumes the somewhat barrel shape illustrated in Fig. 4. It will be understood that in Figs. 2, 3 and 4 the curvatures are considerably exaggerated for the sake of clarity.

The sleeve 2 may, of course, be hardened in the usual manner in order to increase its elasticity, and when brake shoes 14 are employed, they will be applied before the sleeve is placed on the expanding mandrel. The surfaces of the brake shoes are then distorted by the expansion of the mandrel and are then milled to cylindrical conformation as above described.

In the operation of the device herein disclosed, expansion of the sleeve 2 by the wedges 8 and 11 by backward rotation of sprocket 13 causes the sleeve, or the brake shoes 14 thereon when such are employed, to assume a substantially full surface contact with the interior of the hub 1 whereby localized pressures and overheating are avoided and the brake sleeve is utilized to its fullest effectiveness.

What is claimed is:

1. In a coaster brake, a cylindrical hub, a substantially cylindrical expansible brake sleeve therein, and means for anchoring said sleeve against rotation and for expanding the same into frictional contact with the interior of the hub, said sleeve being slightly convex longitudinally when relaxed, said expanding means being operative to true up the cylinder when it is expanded into engagement with the hub.

2. In a coaster brake, a cylindrical hub, a substantially cylindrical brake sleeve therein having staggered longitudinal slots extending alternately from opposite ends to render the sleeve radially expansible, means for preventing rotation of the sleeve, and means for wedging open the ends of the slots, the exterior of said sleeve being normally slightly barrel-shaped and being sprung into a true cylinder by the operation of the wedging means.

3. In a coaster brake, a cylindrical hub, a cylindrical brake sleeve in the hub having longitudinal slots extending inward from each end alternately, the periphery of the sleeve having friction surfaces of substantially the same radius as the interior of the hub, said surfaces being slightly convex longitudinally, and means for wedging open the ends of the slots to expand the sleeve into engagement with the hub.

4. A method of manufacture of expansible cylindrical brake sleeves for coaster brakes or the like including the steps of forming longitudinal slots in a sleeve extending inwardly from each end thereof, wedging the ends of the slots open to expand the sleeve, and then machining the exterior of the sleeve to a true cylinder.

5. A method of manufacture of expansible cylindrical brake sleeves for bicycle hub brakes or the like including the steps of forming staggered longitudinal slots in a sleeve extending inwardly from each end thereof, wedging the ends of the slots open to expand the sleeve, and then machining the exterior of the sleeve to a true cylinder of substantially the same diameter as the interior of the brake hub.

6. A method of manufacture of expansible cylindrical brake sleeves for coaster brakes or the like including the steps of forming staggered longitudinal slots in a sleeve extending inwardly from each end thereof, affixing friction members to the exterior of the sleeve between the slots, wedging the ends of the slots open to expand the sleeve, and then machining the exterior of the friction members to a true cylinder.

STANLEY B. KURZINA, Jr.